United States Patent
Strohmeier et al.

(10) Patent No.: US 9,746,691 B2
(45) Date of Patent: Aug. 29, 2017

(54) OPTOELECTRONIC APPARATUS AND METHOD FOR ALIGNMENT

(71) Applicant: SICK AG, Waldkirch (DE)

(72) Inventors: Dirk Strohmeier, Waldkirch (DE); Florian Schneider, Waldkirch (DE); Denise Bertz, Waldkirch (DE)

(73) Assignee: SICK AG, Waldkirch (DE)

( * ) Notice: Subject to any disclaimer, the term of this patent is extended or adjusted under 35 U.S.C. 154(b) by 33 days.

(21) Appl. No.: 14/661,246

(22) Filed: Mar. 18, 2015

(65) Prior Publication Data

US 2015/0268481 A1 Sep. 24, 2015

(30) Foreign Application Priority Data

Mar. 24, 2014 (DE) .................. 10 2014 104 028

(51) Int. Cl.
| | |
|---|---|
| *G02B 27/64* | (2006.01) |
| *G02B 26/00* | (2006.01) |
| *H04N 5/225* | (2006.01) |
| *H04N 17/00* | (2006.01) |
| *G02B 1/06* | (2006.01) |
| *G01V 8/12* | (2006.01) |
| *G01V 8/20* | (2006.01) |
| *G02B 3/12* | (2006.01) |

(52) U.S. Cl.
CPC ......... *G02B 27/648* (2013.01); *G02B 26/004* (2013.01); *H04N 5/2254* (2013.01); *H04N 17/002* (2013.01); *G01V 8/12* (2013.01); *G01V 8/20* (2013.01); *G02B 1/06* (2013.01); *G02B 3/12* (2013.01)

(58) Field of Classification Search
CPC ... G02B 1/06; G02B 3/12; G02B 3/14; G02B 7/003–7/005; G02B 26/004; G02B 26/005; G02B 27/648; H04N 5/2254; H04N 17/002; G01V 8/12; G01V 8/20; G03B 43/00; G06T 7/0018–7/002; G06T 2207/30244; G06K 9/32; G06K 9/3216; G06K 9/3225

See application file for complete search history.

(56) References Cited

U.S. PATENT DOCUMENTS

| | | | |
|---|---|---|---|
| 9,210,306 B1* | 12/2015 | Gamadia | ............ H04N 5/2251 |
| 2004/0227838 A1 | 11/2004 | Atarashi et al. | |
| 2006/0079728 A1 | 4/2006 | Kuiper et al. | |
| 2010/0289941 A1 | 11/2010 | Ito et al. | |

(Continued)

FOREIGN PATENT DOCUMENTS

| | | |
|---|---|---|
| CN | 101556341 A | 10/2009 |
| DE | 10 2005 015 500 A1 | 10/2005 |

(Continued)

*Primary Examiner* — Dennis Hogue
(74) *Attorney, Agent, or Firm* — Nath, Goldberg & Meyer; Jerald L. Meyer; Stanley N. Protigal

(57) ABSTRACT

An optoelectronic apparatus (10) having a light transmitter (22) and/or a light receiver (16) and an optics (24, 14) arranged in front of the light transmitter (22) and/or the light receiver (16) is provided that has an adaptive lens (26) with variable tilt. In this respect an alignment unit (18) is provided which is configured to tilt the adaptive lens (26) in such a way that manufacturing tolerances and/or assembly tolerances are compensated.

10 Claims, 3 Drawing Sheets

(56) References Cited

U.S. PATENT DOCUMENTS

Figure 1:
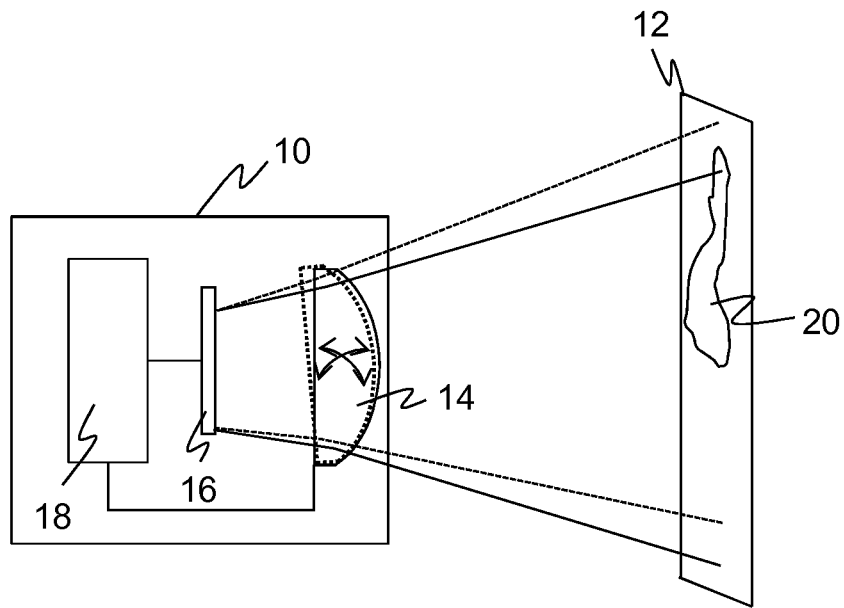

| | | | |
|---|---|---|---|
| 2010/0295987 A1* | 11/2010 | Berge | G02B 3/14 |
| | | | 348/360 |
| 2012/0026297 A1 | 2/2012 | Sato | |
| 2012/0113318 A1 | 5/2012 | Galstian et al. | |
| 2012/0140037 A1 | 6/2012 | Galstian et al. | |
| 2012/0307089 A1* | 12/2012 | Rukes | H04N 5/232 |
| | | | 348/208.99 |
| 2013/0088637 A1* | 4/2013 | Duparre | H04N 5/23212 |
| | | | 348/360 |
| 2013/0229529 A1* | 9/2013 | Lablans | H04N 5/23238 |
| | | | 348/169 |
| 2014/0017625 A1* | 1/2014 | Liu | A61B 1/042 |
| | | | 433/29 |

FOREIGN PATENT DOCUMENTS

| | | |
|---|---|---|
| DE | 10 2005 021 735 A1 | 11/2006 |
| DE | 20 2006 017 268 U1 | 4/2008 |
| DE | 102012104579 A1 | 12/2013 |
| EP | 2 071 367 A1 | 6/2009 |
| EP | 2 789 972 A1 | 10/2014 |
| JP | 2003-98576 A | 4/2003 |
| JP | 2004-341201 A | 12/2004 |
| JP | 2004-342228 A | 12/2004 |
| JP | 2010-239290 A | 10/2010 |

* cited by examiner

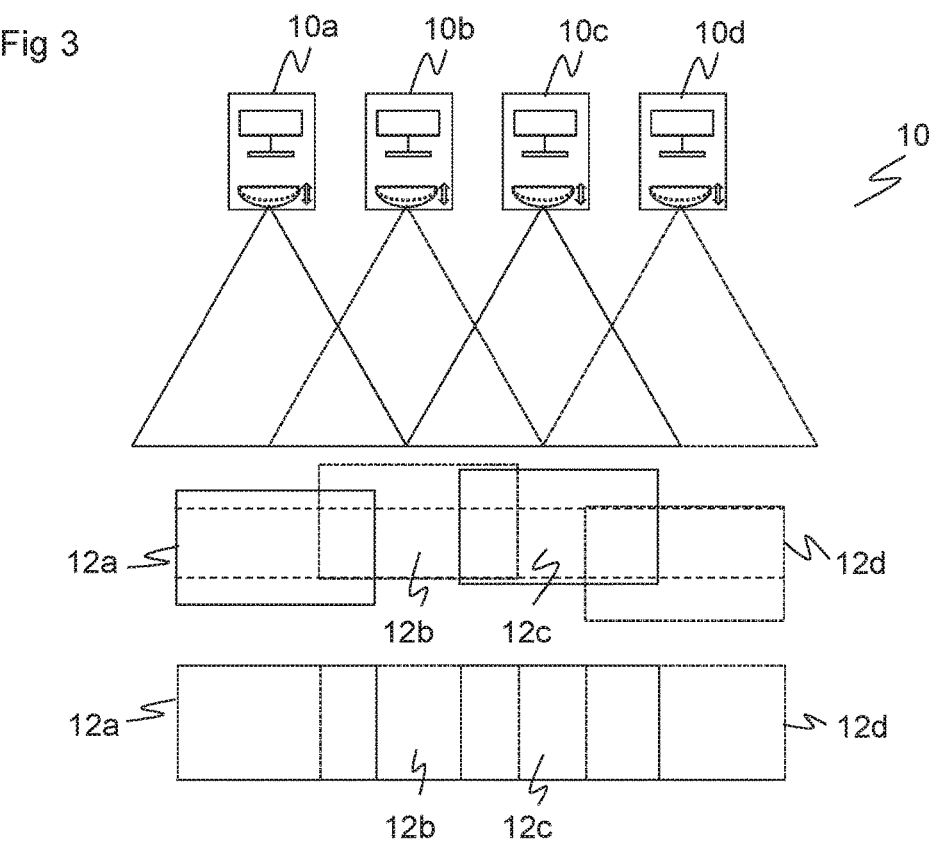
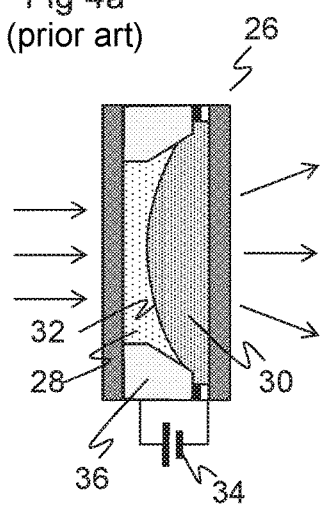
Fig 4a (prior art)
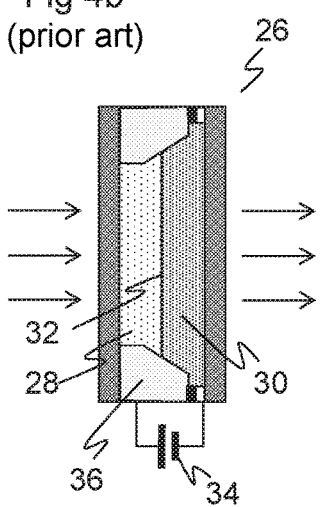
Fig 4b (prior art)
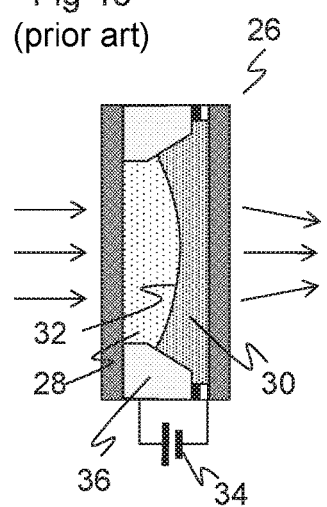
Fig 4c (prior art)

OPTOELECTRONIC APPARATUS AND METHOD FOR ALIGNMENT

The invention relates to optoelectronic apparatus having an adaptive lens, as well as to methods of aligning or exchanging such optoelectronic apparatuses.

A reliable alignment has to be ensured in optical systems with high requirements with regard to quality for a trouble-free function. On the one hand, this relates to the manufacture, where during or after the assembly of the optical components, such as light sources, lenses, filters or image sensors, these have to be aligned with respect to one another in order to compensate tolerances or deviations in batches. The mechanical alignment requires additional degrees of freedom with respect to the design in order to even make available adjustment possibilities having regard to the alignment and, moreover, to make available operating means and/or staff time for the manual, semiautomatic or fully automatic carrying out of the alignment. Thereby, the manufacturing costs are increased considerably.

On the other hand, the alignment also plays an important role in the field of application. In this respect the optical system has to be aligned, on a compensation of displacement and tilting tolerances between the attachment point of the device and a desired illumination field and/or viewing field. If an exchange of an optical system is required this process has to be repeated. During the parallel use of a plurality of optical systems, such as in a multi-head camera having a plurality of camera modules, one has to ensure the mutual alignment.

As an alternative to an alignment, it is also plausible having regard to camera systems to crop the viewing field by means of image processing; however, the viewing field is reduced thereby. This is correspondingly true for the parallelization of a plurality of camera modules, where a tolerance region can be made available as an additional overlap surface in order to obtain a gap-free total viewing field, however, the viewing field is reduced in size due to the additional overlap.

An optics is frequently provided in optical systems that is focused to a certain spacing or spacing region with the aid of a focus adjustment in that the position of the lenses and in this way the focal length of the transmission or receiving optics is adjusted electromechanically or optomechanically. Such solutions require a large construction space and moreover represent high demands with regard to the mechanical assembly with respect to the precise capability of being set such that a predefined focus position is actually assumed. An alternative is the use of optics in which not the focal distance, but rather the shape and in this way the focal length of the lens itself is varied by means of a voltage control. Gel lenses or liquid lenses are in particular used for this purpose. Having regard to a gel lens, a silicone-like liquid is mechanically deformed by means of piezoelectric or inductive actuators. Liquid lenses for example use the so-called electro-wetting effect in that two non-mixable liquids are arranged above one another in a chamber. On an application of a control voltage the two liquids change their surface tension in a different manner such that the inner boundary surface of the liquid changes its curvature in dependence on the voltage. An optoelectronic sensor with focus adjustment on the basis of liquid lenses is respectively known from the DE 10 2005 015 500 A1 or the DE 20 2006 017 268 U1. The focus adjustment enables an adaptation of the scenery, however, does not replace an alignment.

In a further design of liquid lenses for focus adjustment the EP 2 071 367 A1 also suggests the variation of the tilt of the liquid lens by means of the application of different voltages in the circumferential direction. In order to prevent the recording of blurred images, the proper motion of the camera is then determined and one or more lenses are tilted in the camera in order to counter-act this proper motion. This movement compensation is likewise based on an alignment of the camera in itself that was previously conducted. An alignment with regard to the scenery is in any way not established for a handheld camera.

In the DE 10 2005 015 500 A1 a further optoelectronic sensor having a liquid lens is disclosed that can be asymmetrically varied with regard to its beam forming properties by means of an asymmetric frame or different electric potentials applied at separate electrodes of the lens frame. However, the document then does not mention for what purpose this can be used.

For this reason it is an object of the invention to simplify the alignment of an optoelectronic apparatus.

This object is satisfied by an optoelectronic apparatus, as well as by methods for aligning and exchanging such optoelectronic apparatus. The apparatus comprises an optics having an adaptive lens whose tilts can be varied by an electronic control. The adaptive lens is preferably also adjustable with respect to its focal length in order to set a focus position. Through the tilt of the adaptive lens tolerances can be compensated in a very simply manner. This can be manufacturing tolerances of the components themselves, this means deviations in the batches of light transmitters, light receivers or optical elements. A further source are the inaccuracies arising on the installation of the components into the apparatus that lead to assembly tolerances of the components with respect to one another and to a housing. Assembly tolerances can however also relate to the attachment of the apparatus at the position of the application. Frequently, the aim of the alignment is that an illumination field and/or viewing field of the apparatus has a specific geometry and/or orientation, this means that it takes on a desired position, orientation and shape in the scenery.

The invention has the advantage that mechanical alignment processes demanding in effort and cost can be eliminated. Thereby costs in design and for the carrying out of the alignment can be saved. However, a very good adaptability can still be achieved. The tilt is an essential parameter of influence, as tilting tolerances in the focal plane lead to a large lateral displacement.

The alignment unit preferably has a storage element in order to store tilt positions of the adaptive lens as aligned work settings taught during a manufacturing process. By setting the stored tilt position an alignment apparatus arises without mechanical alignment possibilities having to be provided in their design or without an alignment process being required that is demanding in effort and cost. As an alternative to the works setting, also an application specific tilt and in this way alignment is plausible.

The apparatus is preferably configured as a camera having an image sensor as a light receiver. Through the tilt of the adaptive lens, the image sensor and receiving optics are aligned with respect to one another in a simple manner and a viewing field of the camera is set.

The alignment unit is preferably configured to identify at least one image feature in a recording of the image sensor and to store this with its position. With reference to the image feature the alignment unit can check an alignment achieved once. Predominantly, however, the image feature and its position serve as a preparation for a later device exchange. The storage preferably takes place continuously, this means independent of the operation of the apparatus, in this way the data also remains available after a longer operating pause or during a defect. The storage in a superordinate control or at a removable medium is also suitable.

The alignment unit is preferably configured to read in at least one image feature and a position of the image feature and to tilt the adaptive lens in such a way that the image feature is present in a recording of the image sensor at the position. In this way a previously achieved alignment is automatically reproduced with reference to the scenery. The read in data is preferably that which a different device has generated and stored. In this way an exchangeability is achieved in that the exchanged device automatically sets the identical viewing fields like the exchanged device by means of the at least one image feature. In this way, the complete physical viewing field of exchangeable systems remains, without information being lost, for example, by cropping the recording to a smaller common viewing field.

In a further apparatus, at least two image sensors are provided respectively having an optics with an adaptive lens with variable tilt being arranged in front of the image sensors, wherein the viewing fields of the image sensors have an overlap region. The alignment unit in this example identifies at least one image feature in the overlap region and aligns the viewing field of the image sensors with respect to one another by tilting at least one adaptive lens by means of the image feature. Advantageously, the individual viewing fields are located next to one another and are aligned in such a way that no lateral shift is present. Thereby the overall viewing field can be maximized and a very small overlap surface is sufficient for this purpose. The image features or also other image features outside of the overlap region can moreover be stored, as discussed above with respect to an exchange device, in order to enable the replacement of individual camera modules on preservation of the alignment.

The adaptive lens is preferably a liquid lens or a gel lens. Such lenses offer the desired setting possibilities and in this respect are very small from a construction point of view and are cost effective. The tilt of such a lens naturally does not necessarily mean a geometric tilt but rather also relates to the optical effect that corresponds to the effect of a tilt.

The adaptive lens preferably has segmented control elements in a circumferential direction. The control elements are, for example, segmented electrodes that control a liquid lens via the electro wetting effect. Furthermore, segmented actuators, in particular piezo-actuators, are plausible that locally vary the pressure on a liquid and thereby curve a membrane on the liquid to a different degree or that directly deform a gel-like substance of the lens. Through the segmentation in the circumferential direction a non-rotationally symmetric influencing of the lens is enabled that leads to the optical tilt.

The method in accordance with the invention can be adapted in a similar manner by further features and in this respect shows similar advantages. Such further features are described by way of example, but not conclusively in the dependent claims adjoining the independent claims.

In a method, the adaptive lens is tilted in such way that manufacturing tolerances and/or assembly tolerances are compensated. Thereby alignment processes demanding in effort and cost or the use of expensive, components with low tolerance are prevented and a precise alignment is still achieved.

A further method relates to the exchange of a camera having an image sensor and a receiving optics with an adaptive lens arranged in front of the image sensor. In this example a camera that is possibly later exchanged, stores at least one image feature and its position with regard to its image sensor. During the exchange the exchange device uses this information and ensures that the image feature is present at the correct position. In this way it is ensured that the exchange device can take over its function in a like alignment.

Having regard to a further method, at least two cameras with a respective image sensor and an optics arranged in front of the image sensor with an adaptive lens with variable tilt are aligned with respect to one another. For this purpose at least one image feature is identified in an overlap region and the viewing fields of the image sensors are aligned by means of the image feature by tilting at least one of the adaptive lenses with respect to one another. In this respect an aligned complete viewing field of maximum size arises, for which purpose a minimum overlap region is sufficient.

Figure 2:
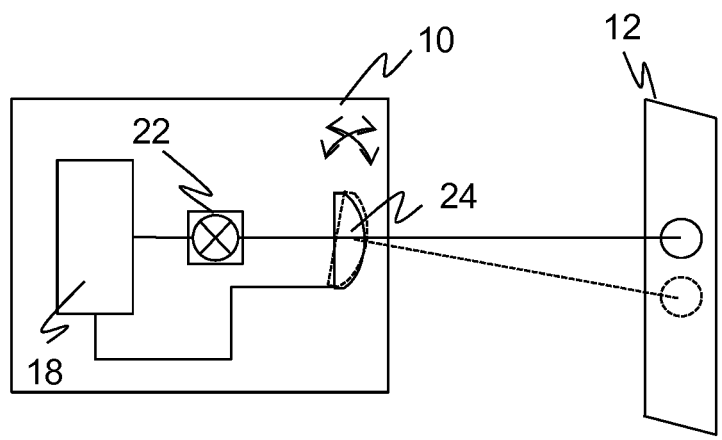
Figure 5A:
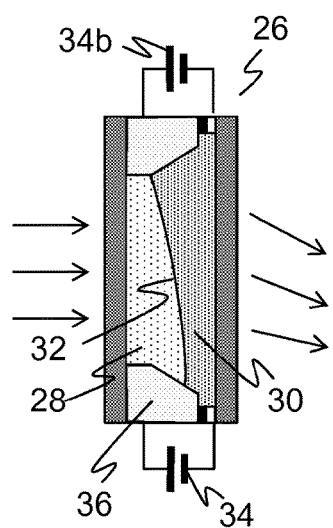
Figure 5B:
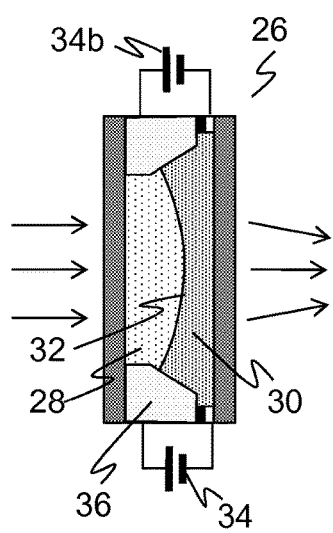
Figure 5C:
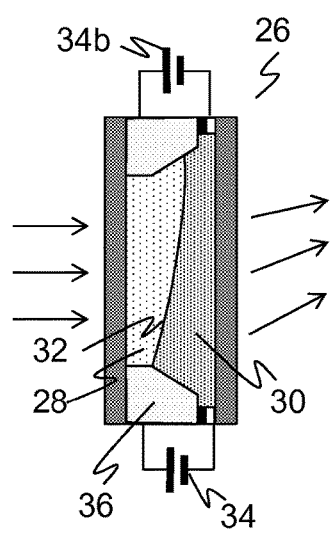

The invention will be described in the following also with regard to further advantages and features with reference to the submitted drawing by means of embodiments. The Figures of the drawing show in:

FIG. 1 a schematic sectional illustration of an optoelectronic apparatus having a light receiver and a tiltable adaptive lens in the receiving optics;

FIG. 2 a schematic sectional illustration of an optoelectronic apparatus having a light transmitter and a tiltable adaptive lens in the transmission optics;

FIG. 3 an illustration for the explanation of a camera arrangement having a plurality of camera modules and the alignment of the viewing fields of the camera modules with the aid of adaptive lenses;

FIG. 4a an illustration of an adaptive lens in a beam expanding setting;

FIG. 4b an illustration of the adaptive lens in a neutral setting;

FIG. 4c an illustration of the adaptive lens in a beam bunching setting;

FIG. 5a an illustration of the adaptive lens with tilt downwardly;

FIG. 5b an illustration of the adaptive lens without tilts;

FIG. 5c an illustration of the adaptive lens with tilt upwardly; and

Figure 6:
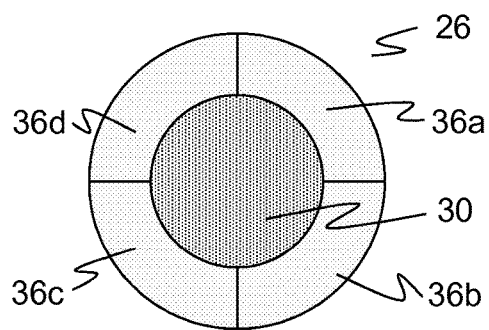

FIG. 6 a top view of the adaptive lens having regard to the illustration of a segmented non-rotationally symmetric control.

FIG. 1 shows a schematic sectional illustration of an embodiment of an optoelectronic apparatus 10 for the detection of object information from a monitored region 12. An image sensor 16, for example a CCD or CMOS chip generates recordings of the monitored region 12 via a receiving optics 14. The image data of these recordings are forwarded to an evaluation unit 18.

The receiving optics 14 has an adaptive lens that can be tilted through an electronic control of the evaluation unit 18. Through the tilt a variation of the viewing field of the apparatus 10 results. The functional principle of the adaptive lens will be described in detail with reference to the FIGS. 4 to 6 in the following. The image sensor 14 and the receiving optics 16, represented in a simplified manner by the adaptive lens in FIG. 4, form a component assembly that can include further non-shown optical elements, such as lenses, mirrors, apertures or filters. The possibility also exists that the apparatus 10 has a plurality of adaptive lenses.

The tilt of the adaptive lens of the receiving optics 16 is utilized for the alignment in a teaching process. In this respect the evaluation unit 18 acts as an alignment unit which controls the adaptive lens in order to change its tilt position. In the teaching process tolerances of the components and their mutual alignment can be reduced by external monitoring and a targeted control of the adaptive lens. This can take place both in the works during the manufacture and also in the field with regard to the specific application. The taught tilt position, as well as the control required therefore can be stored as a work setting in a storage element. In this way it is possible at every time to vary the tilt position of the adaptive lens and to subsequently return to the stored settings.

The embodiment in accordance with FIG. 1 is a camera because of the image sensor 16. Different light receivers form further plausible optoelectronic sensors, such as light barriers, light sensing devices or scanners. Many of such sensors additionally have a light transmitter, wherein an own light transmitter can also be used for a camera as an active illumination. A plethora of applications result in this way, for example, for the detection, inspection and measurement of objects. A barcode scanner or a camera-based code reader arises for the reading of codes through the use of known signal or image processings.

By way of its spatial resolution, the image sensor 16 enables a simple device exchange on a preservation of the alignment and in particular of the viewing field.

For this purpose, the evaluation unit 18 of the original device, this means of the originally used apparatus 10, stores a constantly present and reliably identifiable image feature 20 from the monitored region 20, as well as its position within the viewing field of the apparatus 10, at least once after the completion of the assembly or during the operation thereof. In particular a part of an illumination pattern or a light spot of an own light source are suitable as an image feature 20, in particular then, when no sufficient natural contrast of scenery or no constant scenery region is to be expected, at least for a certain period of time. For example, the apparatus 10 can include a target device and/or a target laser that is used for the visualization of a recording or a reading region.

The data stored with regard to the image feature 20 is loaded during a later taking into operation of an exchange device. The exchange device detects features of scenery and identifies the image feature 20 via a comparison of the features of scenery with the loaded data from the original sensor. Through a control of the adaptive lens, a tilt of the viewing field is carried out up until the image feature 20 is present at the predefined position in this way the viewing field is present at the same position like for the original device also with regard to the exchange device. Thus, a device exchange takes place in an uncomplicated manner and on preservation of the function without the user having to carry out alignment steps and also no crop of the viewing field is required, whereby the effectively available viewing field would be reduced.

FIG. 2 shows a further embodiment of the optoelectronic apparatus 10. This embodiment differs from the embodiment shown in FIG. 1 thereby, that a light transmitter 22 and correspondingly an adaptive lens are provided as a part of the transmission optics 24 rather than the receiving optics 14 instead of a light receiver or the image sensor 16. The alignment described with regard to FIG. 1 for the compensation of part tolerances, manufacturing tolerances and assembly tolerances is also possible in this example in a like manner. Without making specific reference thereto, mixed shapes are mentioned again in which a light transmitter, as well as a light receiver are provided, wherein at least one adaptive lens is provided in the transmission path or in the reception path.

FIG. 3 shows a further example of an alignment by means of a tilt of adaptive lenses. The optoelectronic apparatus 10 has a plurality of camera modules 10a-d for this purpose whose monitoring regions or viewing fields 12a-d complement one another to a larger overall viewing field and which are, for example, respectively assembled just like the apparatus 10 in accordance with FIG. 1. However, not every camera module 10a-d has to have its own evaluation unit 18 which can rather be arranged in a superordinate manner and/or be implemented in a nearly arbitrarily distributed manner. The camera modules 10a-d are connected amongst one another or by means of a superordinate control and can thus communicate with one another.

The camera modules 10a-d arranged in parallel with one another should be aligned with respect to one another for the operation. Regardless thereof, a possible alignment of the camera modules 10a-d remains, as was previously described.

Due to manufacturing and fastening tolerances, the viewing fields 12a-d are not exactly aligned with respect to one another at the start. This is illustrated in the middle of FIG. 3. The common solution would provide the limitation of the common viewing field by software crop to a central region illustrated by the dashed lines. However, a part of the possible viewing field is thereby lost.

In order to match the viewing fields 12a-d with respect to one another, features of scenery or image features in the overlap regions of the viewing fields 12a-d are identified and compared, preferably in the maximum focus spacing. Thus, the alignment can be corrected by tilting the adaptive lens of the camera module 12a-d and the ideal alignment having regard to the maximum size of the overall viewing field results as is shown at the bottom of FIG. 3.

The FIGS. 4 and 5 show the adaptive lens of the receiving optics 14 and/or of the transmission optics 22 in an exemplary embodiment as a liquid lens 26 according to the electro wetting effect. The functional principle is explained with reference to the liquid lens 26. However, the invention also comprises different adaptive lenses, for example, such having a liquid chamber and a membrane covering this whose curvature is changed by a pressure on the liquid, or lenses having a gel-like optical permeable material that is mechanically deformed by an actuator mechanism.

The actively tunable liquid lens 26 has two transparent non-mixable liquids 28, 30 having different refractive indices and like densities. The shape of the liquid-liquid boundary layer 32 between the liquids 28, 30 is used with respect to the optical function. The actuation is based on the principle of electro wetting which shows a dependency on the surface tension or boundary surface tension with regard to the applied electric field. For this reason it is possible to vary the shape of the boundary layer 32 and in this way the optical properties of the liquid lens 26 by means of an electric control at a connection 34, whereby corresponding voltages are applied at an electrode 36.

FIG. 4 initially shows the variation of the focus properties of the liquid lens 26 known for a long time. In FIG. 4a incident light is scattered at a concave boundary layer 32. FIG. 4b shows a neutral setting with a flat boundary layer 32, whereas in FIG. 4c the boundary layer is convex and in this way bunches the incident light. It is clear that the behavior of the refractive indices can be selected to be more sensitive by means of a corresponding intermediate setting and, for example, a focal length can be set.

The liquid lens 26 can however also be influenced in its tilt. This is illustrated in FIG. 5 and is based on non-rotationally symmetrically applied voltages and in this way on the electric fields. Correspondingly the boundary layer 32 is not deformed in a rotationally symmetric manner which is utilized for the tilt. FIG. 5a shows a tilting of the liquid lens 26 downwardly. FIG. 5b shows a rotationally symmetric setting without tilting for the purpose of comparison and FIG. 5c shows a tilt of the liquid lens 26 upwardly. In this respect, the direction of the tilt respectively relates to the optical effect, this means to the direction from which the light is received and/or in which direction the transmission light is transmitted. The tilt can respectively be superimposed with a focus.

FIG. 6 shows a top view onto the liquid lens 26 in order to explain the non-rotationally symmetric control again. For this purpose the electrode 36 is namely segmented. Having regard to the control of the segments 36a-d, by way of example four segments are shown, at least one additional connection 34b, shown in FIG. 5, can be required. The boundary layer 32 is deformed in a non-rotationally symmetric manner and for this reason a tilt of the lens shape can be set besides the focal length through the application of different voltages at the segments 36a-d.

What is claimed is:

1. An optoelectronic apparatus comprising:
    a light receiver configured as a camera having an image sensor and having optics arranged in front of the light receiver, wherein the optics comprise an adaptive lens with variable tilt,
    an alignment unit configured to tilt the adaptive lens so as to compensate manufacturing tolerances and/or assembly tolerances,
    wherein the alignment unit is configured to identify and read at least one image feature and a position of the image feature in a recording of the image sensor and to store the recording of the image sensor, the recording of the image sensor comprising the position, and to adjust the alignment of a replacement image sensor to a same position as that of a previous image sensor by tilting the adaptive lens of the replacement image sensor in such a way that to position a viewing field of the replacement image sensor to achieve said same position.

2. The optoelectronic apparatus in accordance with claim 1,
    wherein the alignment unit has a storage element in order to store tilt positions of the adaptive lens as aligned work settings, the tilt positions being taught during a manufacturing process.

3. The optoelectronic apparatus in accordance with claim 1,
    wherein the adaptive lens is a liquid lens or a gel lens.

4. The optoelectronic apparatus in accordance with claim 1,
    wherein the adaptive lens has segmented control elements in the circumferential direction.

5. An optoelectronic apparatus comprising at least two image sensors in front of which a respective optics having an adaptive lens with variable tilt is arranged and configured to permit exchange of the image sensors, wherein the respective viewing fields of the image sensor have an overlap region, the apparatus comprising:
    an alignment unit configured to identify at least one image feature in the overlap region and to align the viewing fields of the image sensors with respect to one another by tilting at least one adaptive lens with reference to the image feature to achieve a desired alignment with respect to an overall viewing field,
    wherein the sensors store said image feature and a position of the image feature with respect to its image sensor and the optoelectronic apparatus reads in the image feature and the position of the image feature and tilts its adaptive lens to position the image feature is present in a recording of its image sensor at the position.

6. The optoelectronic apparatus in accordance with claim 5,
    that is configured as a camera having an image sensor as a light receiver.

7. The optoelectronic apparatus in accordance with claim 5,
    wherein the adaptive lens is a liquid lens or a gel lens.

8. The optoelectronic apparatus in accordance with claim 5,
    wherein the adaptive lens has segmented control elements in the circumferential direction.

9. A method for the exchange of an optoelectronic apparatus having an image sensor and receiving optics with an adaptive lens arranged in front of the image sensor, the method comprising:
    storing, with an optoelectronic apparatus to be exchanged, at least one image feature and a position of the image feature with respect to the image sensor of the optoelectronic apparatus to be exchanged;
    reading, with an optoelectronic apparatus provided for the exchange, the image feature and the position of the image feature; and
    tilting the adaptive lens of the optoelectronic apparatus provided for the exchange in such a way that the image feature is present in a recording of the image sensor of the optoelectronic apparatus provided for the exchange at the position, so as to adjust the alignment of the image sensor of the optoelectronic apparatus provided for the exchange to a same position as that of the image sensor of the optoelectronic apparatus to be exchanged.

10. A method for the mutual alignment of at least two optoelectronic apparatuses which each comprise an image sensor and an optics having an adaptive lens with variable tilt arranged in front of the image sensor, wherein the viewing fields of the image sensors have an overlap region, the method comprising the steps of:
    identifying at least one image feature in the overlap region;
    storing at least one image feature and a position of the identified image feature with respect to the image sensor;
    aligning the viewing fields of the image sensors with respect to one another with reference to the image feature by tilting at least one adaptive lens to achieve a desired alignment the image sensors with respect to an overall viewing field so as to compensate for manufacturing tolerances and/or assembly tolerances; and
    identifying and reading at least one image feature in a recording of the image sensors and storing the recording of each of the image sensors, the recording of each of the image sensors comprising a position of the image sensor.

* * * * *